United States Patent
Chu

(10) Patent No.: US 11,822,988 B2
(45) Date of Patent: Nov. 21, 2023

(54) COMPUTER SYSTEM AND METHOD FOR CREATING AN AUGMENTED ENVIRONMENT USING QR TAPE

(71) Applicant: Procore Technologies, Inc., Carpinteria, CA (US)

(72) Inventor: Winson Chu, Alameda, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 0 days.

(21) Appl. No.: 17/833,375

(22) Filed: Jun. 6, 2022

(65) Prior Publication Data
US 2022/0375182 A1 Nov. 24, 2022

Related U.S. Application Data

(63) Continuation of application No. 17/104,362, filed on Nov. 25, 2020, now Pat. No. 11,354,876, which is a
(Continued)

(51) Int. Cl.
*G06K 19/06* (2006.01)
*G06T 19/20* (2011.01)
(Continued)

(52) U.S. Cl.
CPC ..... *G06K 19/06037* (2013.01); *G06K 7/1417* (2013.01); *G06T 19/006* (2013.01);
(Continued)

(58) Field of Classification Search
None
See application file for complete search history.

(56) References Cited

U.S. PATENT DOCUMENTS

| 9,830,491 B2 * | 11/2017 | Laurent | G06K 7/1443 |
| 10,078,914 B2 * | 9/2018 | Koga | G06T 19/006 |

(Continued)

FOREIGN PATENT DOCUMENTS

KR 10-2019-0032501 A 3/2019

OTHER PUBLICATIONS

Park, H. S., et al. "Development of AR system for generating operation program of automobile assembly system." 2009 IEEE International Symposium on Assembly and Manufacturing. IEEE, 2009.*
(Continued)

*Primary Examiner* — Ryan M Gray
(74) *Attorney, Agent, or Firm* — Lee Sullivan Shea & Smith LLP

(57) ABSTRACT

Disclosed herein is an improved AR technology for aligning virtual content with a real-world environment. In one aspect, the disclosed process may involve a first computing device receiving an indication that a second computing device detected a given QR pattern on a given strip of QR tape installed in a real-world environment. In response to receiving the indication, the first computing device may obtain installation information regarding a layout of the given strip of QR tape. Based at least on an identifier of the given QR pattern and the information regarding the layout of the given strip of QR tape, the first computing device may then determine a position and orientation of the second computing device, align virtual content on the real-world environment, and instruct the second computing device to present a view of the real-world environment that has the aligned virtual content superimposed onto the real-world environment.

19 Claims, 7 Drawing Sheets

Related U.S. Application Data continuation of application No. 16/447,617, filed on Jun. 20, 2019, now Pat. No. 10,854,016.

(51) Int. Cl.
   *G06T 19/00* (2011.01)
   *G06K 7/14* (2006.01)
   *G06V 20/20* (2022.01)

(52) U.S. Cl.
   CPC .............. *G06T 19/20* (2013.01); *G06V 20/20* (2022.01); *G06T 2200/04* (2013.01); *G06T 2219/2004* (2013.01)

(56) References Cited

U.S. PATENT DOCUMENTS

| | | | |
|---|---|---|---|
| 10,169,924 | B2 | 1/2019 | Rosenthal et al. |
| 10,242,456 | B2* | 3/2019 | Weller .................. G06T 19/006 |
| 10,481,679 | B2 | 11/2019 | Sevostianov |
| 10,854,016 | B1* | 12/2020 | Chu ....................... G06T 19/006 |
| 11,219,557 | B2 | 1/2022 | Scaife |
| 2013/0049976 | A1 | 2/2013 | Maggiore |
| 2013/0141461 | A1* | 6/2013 | Salter ........................ G06T 7/74 345/633 |
| 2014/0210856 | A1 | 7/2014 | Finn et al. |
| 2016/0232713 | A1 | 8/2016 | Lee |
| 2016/0242744 | A1 | 8/2016 | Mihailescu et al. |
| 2016/0321530 | A1* | 11/2016 | Troy ...................... G06Q 10/02 |
| 2017/0086712 | A1* | 3/2017 | Mauro .................. A61B 5/7221 |
| 2017/0103290 | A1 | 4/2017 | Guionneau et al. |
| 2018/0165882 | A1 | 6/2018 | Choi et al. |
| 2018/0293801 | A1* | 10/2018 | Metzler ............ G06K 19/06037 |
| 2019/0122440 | A1 | 4/2019 | Barros et al. |
| 2019/0172221 | A1 | 6/2019 | Weller et al. |
| 2019/0235531 | A1 | 8/2019 | Liu et al. |
| 2021/0406451 | A1 | 12/2021 | Iyer et al. |
| 2021/0406868 | A1 | 12/2021 | Brightman et al. |

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

ARKit. Datasheet [online]. Apple Developer Documentation, Apr. 28, 2018 [originally retrieved Jul. 16, 2019]. Retrieved from the Internet: <https://developer.apple.com/documentation/arkit>.

Essential Matrix. Datasheet [online]. Wikipedia, Jul. 22, 2017 [originally retrieved Jul. 16, 2019]. Retrieved from the Internet: <https://en.wikipedia.org/wiki/Essential_matrix>.

Fundamental matrix (computer vision). Datasheet [online]. Wikipedia, Apr. 6, 2019 [originally retrieved Jul. 16, 2019]. Retrieved from the Internet: <https://en.wikipedia.org/wiki/Fundamental_matrix_(computer_vision)>.

Zauner, Jurgen, and Michael Haller. "Authoring of Mixed Reality Applications including Multi-Marker Calibration for Mobile Devices." EGVE. 2004.

Baratoff, Gregory, Alexander Neubeck, and Holger Regenbrecht. "Interactive Multi-Marker Calibration for Augmented Reality Applications." Proceedings. International Symposium on Mixed and Augmented Reality. IEEE, 2002.

International Searching Authority, International Search Report and Written Opinion, PCT/US2020/037794, dated Sep. 25, 2020, 10 pages.

* cited by examiner

COMPUTER SYSTEM AND METHOD FOR CREATING AN AUGMENTED ENVIRONMENT USING QR TAPE

CROSS-REFERENCE TO RELATED APPLICATIONS

This application is a continuation of, and claims priority to, U.S. Non-Provisional application Ser. No. 17/104,362, filed Nov. 25, 2020, and entitled "Computer System and Method for Creating an Augmented Environment Using QR Tape," which is a continuation of U.S. Non-Provisional application Ser. No. 16/447,617, filed Jun. 20, 2019, and entitled "Computer System and Method for Creating an Augmented Environment Using QR Tape," each of which is incorporated herein by reference in its entirety.

BACKGROUND

Augmented Reality ("AR") is a technology that overlays computer-generated graphics (i.e., virtual content) on a view of the real-world environment to provide an enhanced view of the real-world environment. In this respect, virtual content is superimposed in such a way as to appear a natural part of the real-world environment.

To superimpose virtual content on a view of the real-world environment, a computing device with AR capabilities (which may be referred to herein as an "AR-enabled device"), generally functions to present a view of the real-world environment that has overlaid virtual content, which may be generated by the AR-enabled device or received from another computing device. Many types of AR-enabled devices exist, such as a smartphone, tablet, laptop, and wearable devices (e.g., head-mounted displays), among other computing devices. Depending on the type of AR-enabled device being used to experience AR, an enhanced view that superimposes virtual content on a view of the real-world environment may be presented in various manners.

For example, the enhanced view may be presented on a display screen of an AR-enabled device, in which case the computing device may comprise a camera that captures the real-world environment in the form of image data that is presented via the display screen along with the overlaid virtual content. As another example, in certain types of AR-enabled devices such as a head-mounted display, the view of the real-world environment may be what the user perceives through the lens of the head-mounted display, and the enhanced view may be presented on the head-mounted display with virtual content overlaid on the view of the real-world environment.

AR can provide value in various fields, such as construction, industrial design, entertainment (e.g., gaming), home decoration, etc. Depending on the use case scenario, virtual content that is overlaid on the view of the real-world environment can take various forms. For instance, some scenarios may only require virtual content (e.g., text) to be overlaid on the view of the real-world environment without any need to accurately align the virtual content to the real-world environment. However, most scenarios generally demand a relatively accurate alignment of virtual content (e.g., image, video, etc.) on the view of the real-world environment, such that the virtual content is rendered in such a way as to appear a natural part of the real-world environment. To accomplish this goal, the pose (e.g., position and orientation) of an AR-enabled device must be determined, and based on the determination, the AR-enabled device must present an enhanced view that properly aligns the virtual content on the view of the real-world environment.

OVERVIEW

Currently, some AR software applications exist that are capable of superimposing virtual content on a view of a real-world environment. For instance, some AR software applications may utilize a visual tracking technique known as "marker-based AR," which generally involves (1) placing a visual marker that is embedded with information identifying virtual content, such as a Quick Response ("QR") code, on a real object, (2) associating the coordinates of where the visual marker was placed with the real object using an AR software application, (3) calculating the position and orientation of an AR-enabled device relative to the visual marker that may be detected by the AR-enabled device, and then (4) providing an enhanced view of the real-world environment by properly aligning the virtual content associated with the visual marker with the view of the real-world environment.

However, this process has many drawbacks for scenarios that involve superimposing virtual content on a view of the real-world environment that includes large objects and/or many objects. For instance, the process of placing QR codes on large objects and associating the coordinates of where each QR code was placed on a given object may become impractical in scenarios that involve superimposing virtual content on a real-world environment such as a building, which may include various large objects such as floor, walls, ceiling, or the like.

As one specific example to illustrate, given that a wall of a building is comparatively larger than the size of a QR code, multiple QR codes may need to be placed on the wall to properly align virtual content on the wall. However, the process of placing multiple QR codes on a wall of a building and then associating the exact coordinates of where each QR code was placed on the wall (e.g., 5 ft. from the left side of the wall, and 2 ft. from the bottom of the wall) using an AR software application may become inefficient (e.g., time consuming, prone to errors) and/or impractical for large buildings with many walls and multiple floors.

Further, while a user experiencing AR may detect a QR code with an AR-enabled device to perceive a view of the real-world environment with virtual content that is properly overlaid on the real-world environment, once the user moves the AR-enabled device away from the QR code and can no longer detect the QR code, the virtual content that is overlaid on the real-world environment may become misaligned, which degrades the user's AR experience. While some AR software applications may utilize a visual tracking technique known as "markerless AR" to alleviate this problem by relying on the AR-enabled device's sensors (e.g., accelerometer, gyroscope, GPS) to calculate the position and orientation of the AR-enabled device, such sensors may become unreliable in certain real-world environments as the user moves from one area of a real-world environment to another area that is further away from a QR code.

To address these and other problems with existing tracking techniques, disclosed herein is an improved AR technology for aligning virtual content with a real-world environment. The disclosed AR technology makes use of "QR tape" comprising a series of "QR patterns" to properly align virtual content with a real-world environment. At a high level, the disclosed AR technology may be embodied in the form of an AR software application that comprises (1) a first software component that functions to receive installation information and cause the installation information to be stored, (2) a second software component that functions to determine a position and orientation of a computing device (e.g., an AR-enabled device) and align virtual content on a real-world environment based on the determined position and orientation of the computing device, and (3) a third software component that functions to present a view of the real-world environment that has the aligned virtual content superimposed onto the real-world environment. The disclosed software application is described in further detail below.

Accordingly, in one aspect, disclosed herein is a method that involves a first computing device (1) receiving an indication that a second computing device detected a given QR pattern on a given strip of QR tape that has been installed in a real-world environment, where the indication comprises an identifier of the given QR pattern, and in response to receiving the indication, (2) obtaining installation information for the given strip of QR tape, where the installation information comprises information regarding a layout of the given strip of QR tape, (3) based at least on the identifier of the given QR pattern and the information regarding the layout of the given strip of QR tape, determining a position and orientation of the second computing device, (4) aligning virtual content on the real-world environment based on the determined position and orientation of the second computing device and (5) instructing the second computing device to present a view of the real-world environment that has the aligned virtual content superimposed onto the real-world environment.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a first computing device that includes at least one processor, a non-transitory computer-readable medium, and program instructions stored on the non-transitory computer-readable medium that are executable by the at least one processor to cause the first computing device to carry out the functions disclosed herein, including but not limited to the functions of the foregoing method.

One of ordinary skill in the art will appreciate these as well as numerous other aspects in reading the following disclosure.

DETAILED DESCRIPTION

Figure 1:
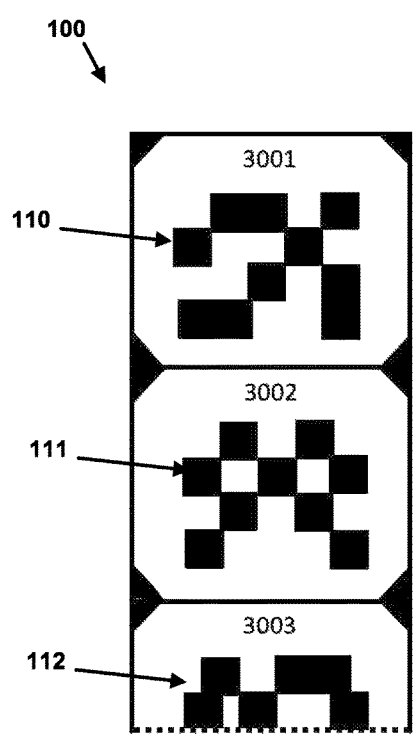
FIG. 1 depicts an example strip of QR tape that may be installed in a real-world environment

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

As described above, the present disclosure is generally directed to an improved AR technology for aligning virtual content on a real-world environment. The disclosed AR technology makes use of "QR tape" comprising a series of visual markers referred to herein as "QR patterns" to properly align virtual content on a real-world environment.

In one aspect, to properly align virtual content on a real-world environment, the disclosed technology may involve installing QR tape on one or more objects in the real-world environment. For example, QR tape may be installed on one or more walls in a building. The disclosed QR tape may take various forms, which may depend on the width of the QR tape, the size of each QR pattern on the QR tape, and/or the spacing between each QR pattern.

Generally speaking, the disclosed QR tape may take a form that can be easily installed on a real object in a given real-world environment. As one example, QR tape may take the form similar to duct tape, such that the QR tape can be easily installed on a real object in a given real-world environment (e.g., a specific wall of a building). In this respect, a roll of QR tape (similar to a roll of duct tape) may be used to install a strip of QR tape on a real object and each strip of QR tape may comprise one or more QR patterns. As another example, QR tape may be embedded in wallpaper that can be installed on a wall as a permanent fixture. In this respect, the wallpaper embedded with QR tape can be used as a marker for aligning virtual content on a real-world environment, and the QR tape that is embedded in the wallpaper may be printed using ink that is invisible to the naked eye but visible to AR-enabled devices such that the wallpaper embedded with QR tape can also be used for decorative purposes.

Further, in both examples above, the QR tape may comprise a respective identifier (e.g., a sequence number) for each QR pattern that is on the QR tape in order to distinguish a given QR pattern from other QR patterns on the QR tape. One of ordinary skill in the art will appreciate that QR tape may take various other forms as well.

A given QR pattern on a QR tape may take various forms as well. For example, a given QR pattern may comprise a machine-readable array of shapes that are arranged in a particular manner and encoded with information (e.g., information associated with virtual content, information associated with a respective identifier, etc.) that can be detected by an AR-enabled device. As another example, a given QR pattern may take the form of a QR code or any other form that can be detected by an AR-enabled device, such as a 3DI code, aztec code, dot code, eZCode, among other examples.

In practice, the spacing between each QR pattern on a strip of QR tape may be wide enough such that an AR-enabled device can detect at least one QR pattern within the AR-enabled device's field of view from a given distance. However, it should be understood that depending on the real-world environment, the camera resolution of an AR-enabled device, and/or the size of the objects in the real-world environment, the size of a strip of QR tape (and the size of each QR pattern on the QR tape and the spacing between each QR pattern) may vary as well. For instance, the size of a strip of QR tape can be very thin if AR-enabled devices that are used to detect QR tape are equipped with high resolution cameras, and as the resolution of cameras on these AR-enabled devices continue to improve in the future, it may be possible use QR tape that thin enough to be almost invisible to the naked eye. A given QR pattern on a QR tape may take various other forms as well.

As one particular example to illustrate, FIG. 1 depicts an example strip of QR tape 100 that includes QR pattern 110, QR pattern 111, and a portion of QR pattern 112. As shown, each QR pattern comprises a respective machine-readable array of shapes that distinguishes the QR patterns from one another, and QR tape 100 comprises a respective identifier for a given QR pattern. For example, QR pattern 110 corresponding to an identifier labeled "3001" comprises a machine-readable array of square and rectangular shapes that are arranged in a particular manner, whereas QR pattern 111 corresponding to an identifier labeled "3002" comprises a machine-readable array of square and rectangular shapes that are arranged in a manner that is different than the manner in which the array of square and rectangular shapes on QR pattern 110 is arranged. One of ordinary skill in the art will appreciate that the respective identifier and/or the machine-readable array on each QR pattern may take various other forms, and in this respect, the QR tape may take various other forms as well.

In another aspect, in accordance with the present disclosure, the disclosed AR technology may be embodied in the form of an AR software application that makes use of the installed QR tape to properly align virtual content on a real-world environment and then cause an AR-enabled device to present a superimposed view with virtual content overlaid on the real-world environment. At a high level, the disclosed AR software application may comprise (1) a first software component that functions to receive installation information and cause the installation information to be stored, (2) a second software component that functions to determine a position and orientation of a computing device (e.g., an AR-enabled device) and align virtual content on a real-world environment based on the determined position and orientation of the computing device, and (3) a third software component that functions to present a view of the real-world environment that has the aligned virtual content superimposed onto the real-world environment.

It should be understood that the disclosed AR software application may comprise more or less software components than the software components noted above. For instance, the disclosed AR software application may comprise the first software component noted above and a second software component that functions to determine a position and orientation of a computing device (e.g., an AR-enabled device), align virtual content on a real-world environment based on the determined position and orientation of the computing device (e.g., AR-enabled device), and present a view of the real-world environment that has the aligned virtual content superimposed onto the real-world environment.

In practice, the software components of the disclosed AR software application may be running on an AR-enabled device of a user interested in experiencing AR within a real-world environment and one or both of (a) a client station in communication with the AR-enabled device or (b) a back-end platform in communication with the AR-enabled device and/or an associated client station. However, it should be understood that all of the software components may be running on an AR-enabled device of the user interested in experiencing AR.

Further, one of ordinary skill in the art will appreciate that the software components of the disclosed AR software application may be running on a computing device that does not have any AR capabilities and one or both of (a) a client station in communication with the computing device or (b) a back-end platform in communication with the computing device and/or an associated client station. In such a configuration, the computing device may be configured to capture images and/or videos of QR tape installed in a real-world environment, and the client station and/or the back-end platform may be configured to determine a position and orientation of the computing device based on the captured images and/or videos, align virtual content on a real-world environment based on the determined position and orientation of the computing device, and then communicate with the computing device to provide a view of the real-world environment that has the aligned virtual content superimposed onto the real-world environment.

Figure 2:
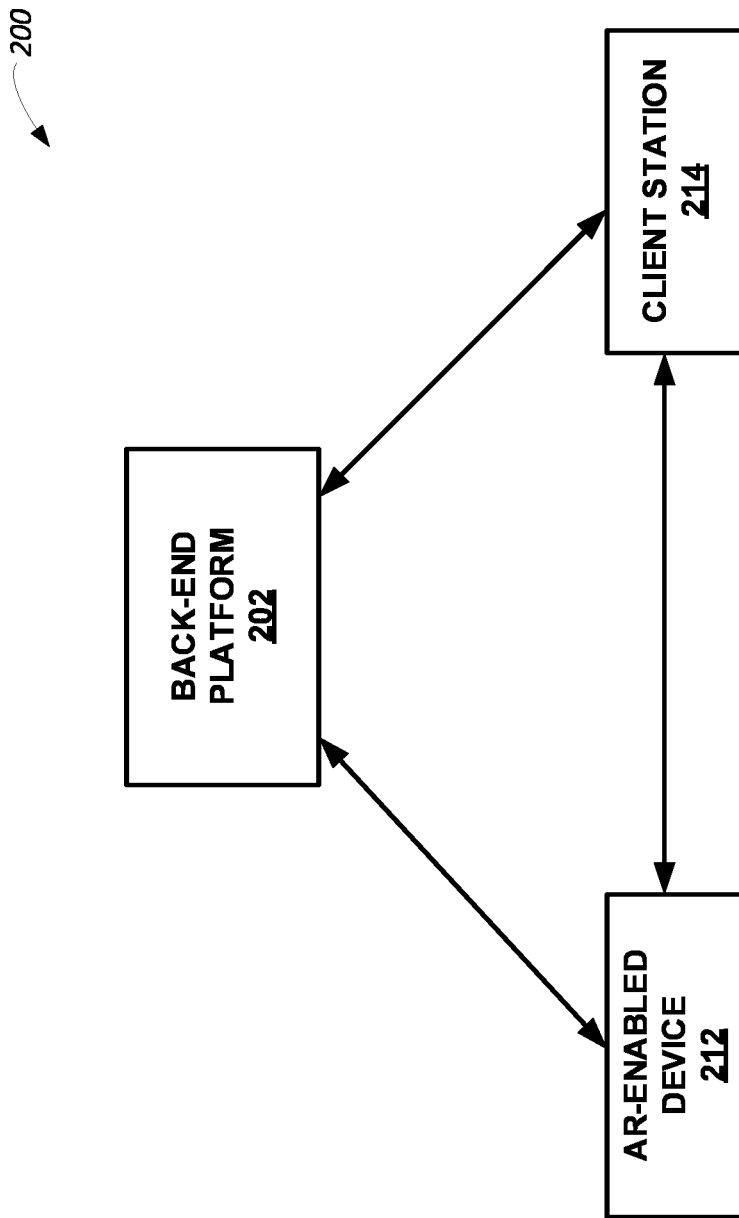
FIG. 2 depicts an example network configuration in which example embodiments may be implemented.

To illustrate one example configuration, FIG. 2 depicts an example system configuration 200 in which example embodiments of the present disclosure may be implemented. As shown in FIG. 2, system configuration 200 includes a back-end platform 202 that may be communicatively coupled to one or more computing devices and/or client stations, such as AR-enabled device 212 and client station 214.

In general, back-end platform 202 may comprise one or more computing systems that have been provisioned with software for carrying out one or more of the functions disclosed herein, including but not limited to functions related to aligning virtual content with a real-world environment. The one or more computing systems of back-end platform 202 may take various forms and be arranged in various manners.

For instance, as one possibility, back-end platform 202 may comprise computing infrastructure of a public, private, and/or hybrid cloud (e.g., computing and/or storage clusters) that has been provisioned with software for carrying out one or more of the platform functions disclosed herein. In this respect, the entity that owns and operates back-end platform 202 may either supply its own cloud infrastructure or may obtain the cloud infrastructure from a third-party provider of "on demand" computing resources, such include Amazon Web Services (AWS) or the like. As another possibility, back-end platform 202 may comprise one or more dedicated servers that have been provisioned with software for carrying out one or more of the platform functions disclosed herein. Other implementations of back-end platform 202 are possible as well.

In turn, AR-enabled device 212 and client station 214 may take any of various forms, examples of which may include a desktop computer, a laptop, a netbook, a tablet, a smartphone, and/or a personal digital assistant (PDA), among other possibilities. In line with the discussion above, AR-enabled device 212 may also take the form of a wearable device (e.g. head-mounted display) and may take various other forms as well.

As further depicted in FIG. 2, back-end platform 202, AR-enabled device 212, and client station 214 are configured to interact with one another over respective communication paths. For instance, the communication path with back-end platform 202 may generally comprise one or more communication networks and/or communications links, which may take any of various forms. For instance, each respective communication path with back-end platform 202 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end platform 202 may be wireless, wired, or some combination thereof, and may carry data according to any of various different communication protocols. Although not shown, the respective communication paths with back-end platform 202 may also include one or more intermediate systems. For example, it is possible that back-end platform 202 may communicate with AR-enabled device 212 and/or client station 214 via one or more intermediary systems, such as a host server (not shown). Many other configurations are also possible.

Similarly, the communication path between AR-enabled device 212 and client station 214 may generally comprise one or more communication networks and/or communications links, which may also take various forms. For instance, the communication path between AR-enabled device 212 and client station 214 may include any one or more of point-to-point links, Personal Area Networks (PANs), and Local-Area Networks (LANs), among other possibilities. Further, the communication networks and/or links that make up the communication path between AR-enabled device 212 and client station 214 may be wireless, wired, or some combination thereof, and may carry data according to any of various different communication protocols. Many other configurations are also possible.

Although not shown in FIG. 2, back-end platform 202 may also be configured to receive data from one or more external data sources that may be used to facilitate functions related to the disclosed process. A given external data source—and the data output by such data sources—may take various forms.

As one example, a given external data source may comprise a datastore that stores installation information, such as information associated with QR tape that has been installed on an object in a real-world environment, and back-end platform 202 may be configured to obtain the installation information from the given data source. A given external data source may take various other forms as well.

It should be understood that system configuration 200 is one example of a system configuration in which embodiments described herein may be implemented. Numerous other arrangements are possible and contemplated herein. For instance, other system configurations may include additional components not pictured and/or more or less of the pictured components.

In line with the example configuration above, the software components of the disclosed AR software application may be running on an AR-enabled device of a user interested in experiencing AR in a real-world environment and one or both of (a) a client station in communication with the AR-enabled device or (b) a back-end platform in communication with the AR-enabled device and/or an associated client station. In this respect, the software components of the disclosed AR software application may be distributed in various manners.

In one example implementation, the first software component may be running on client station 214 to receive installation information associated with QR tape that has been installed, the second software component may be running on back-end platform 202 to determine a position and orientation of AR-enabled device 212 and align virtual content on a real-world environment based on the determined position and orientation of AR-enabled device 212, and the third software component may be installed on AR-enabled device 212 to present a view of the real-world environment that has the aligned virtual content superimposed onto the real-world environment. In this respect, the software components of the disclosed AR software application may be distributed between the back-end platform 202, AR-enabled device 212, and client station 214 to enhance a user's AR experience.

In another example implementation, both the first and third software components may be running on AR-enabled device 212 to receive installation information associated with QR tape that has been installed and present a view of the real-world environment that has the aligned virtual content superimposed onto the real-world environment, and the second software component may be running on back-end platform 202 to determine a position and orientation of AR-enabled device 212 and align virtual content on a real-world environment based on the determined position and orientation of AR-enabled device 212. In this respect, the software components of the disclosed AR software application may be distributed between back-end platform 202 and AR-enabled device 212 to enhance a user's AR experience.

In yet another example implementation, both the first and second software components may be running on client station 214, and the third software component may be running on AR-enabled device 212. In such an implementation, the software components of the disclosed AR software application may be distributed between AR-enabled device 212 and client station 214, and back-end platform 202 may interact with and/or drive the software components running on AR-enabled device 212 and client station 214.

In a further example implementation, the first, second, and third software components may all be running on AR-enabled device 212 and back-end platform 202 may interact with and/or drive the software components installed on AR-enabled device 212. In this respect, client station 214 may not be involved in the disclosed process to enhance a user's AR experience. The software components of the disclosed AR software application may be distributed in various other manners as well.

II. EXAMPLE PLATFORM

Figure 3A:
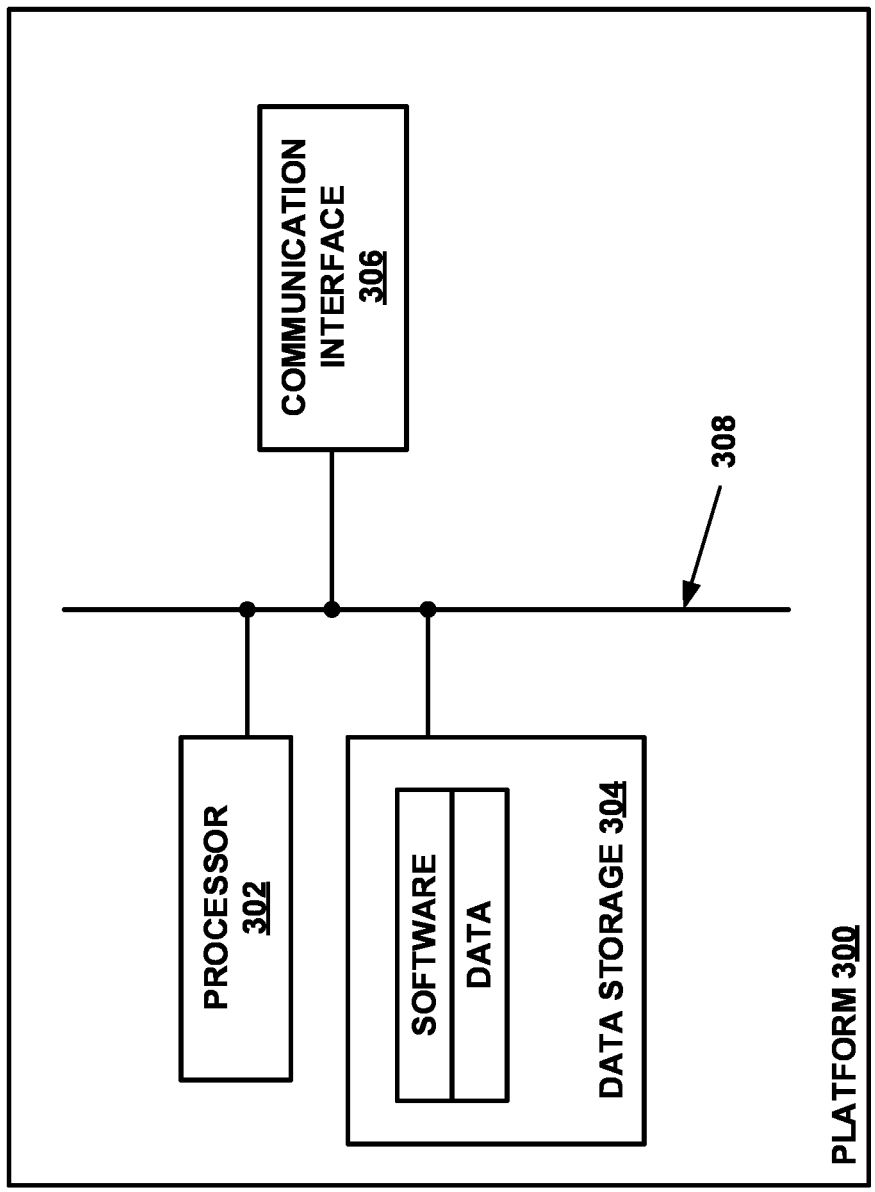
FIG. 3A depicts an example computing platform that may be configured to carry out one or more of the functions of the present disclosure.

FIG. 3A is a simplified block diagram illustrating some structural components that may be included in an example computing platform 300, which could serve as back-end platform 202 of FIG. 2. In line with the discussion above, platform 300 may generally comprise one or more computer systems (e.g., one or more servers), and these one or more computer systems may collectively include at least a processor 302, data storage 304, and a communication interface 306, all of which may be communicatively linked by a communication link 308 that may take the form of a system bus, a communication network such as a public, private, or hybrid cloud, or some other connection mechanism.

Processor 302 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 302 could comprise processing components that are distributed across a plurality of physical computing devices connected via a network, such as a computing cluster of a public, private, or hybrid cloud.

As shown in FIG. 3A, data storage 304 may be provisioned with software components that enable the platform 300 to carry out the functions disclosed herein. These software components may generally take the form of program instructions that are executable by the processor 302 to carry out the disclosed functions, which may be arranged together into software applications, virtual machines, software development kits, toolsets, or the like. Further, data storage 304 may be arranged to store data in one or more databases, file systems, or the like. Data storage 304 may take other forms and/or store data in other manners as well.

Communication interface 306 may be configured to facilitate wireless and/or wired communication with external data sources, client stations, and/or AR-enabled devices such as AR-enabled device 212 and client station 214 in FIG. 2. Additionally, in an implementation where platform 300 comprises a plurality of physical computing devices connected via a network, communication interface 306 may be configured to facilitate wireless and/or wired communication between these physical computing devices (e.g., between computing and storage clusters in a cloud network). As such, communication interface 306 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 306 may also include multiple communication interfaces of different types. Other configurations are possible as well.

Although not shown, platform 300 may additionally include one or more interfaces that provide connectivity with external user-interface equipment (sometimes referred to as "peripherals"), such as a keyboard, a mouse or trackpad, a display screen, a touch-sensitive interface, a stylus, speakers, etc., which may allow for direct user interaction with platform 300.

It should be understood that platform 300 is one example of a computing platform that may be used with the embodiments described herein. Numerous other arrangements are possible and contemplated herein. For instance, other computing platforms may include additional components not pictured and/or more or less of the pictured components.

III. EXAMPLE CLIENT STATION

Figure 3B:
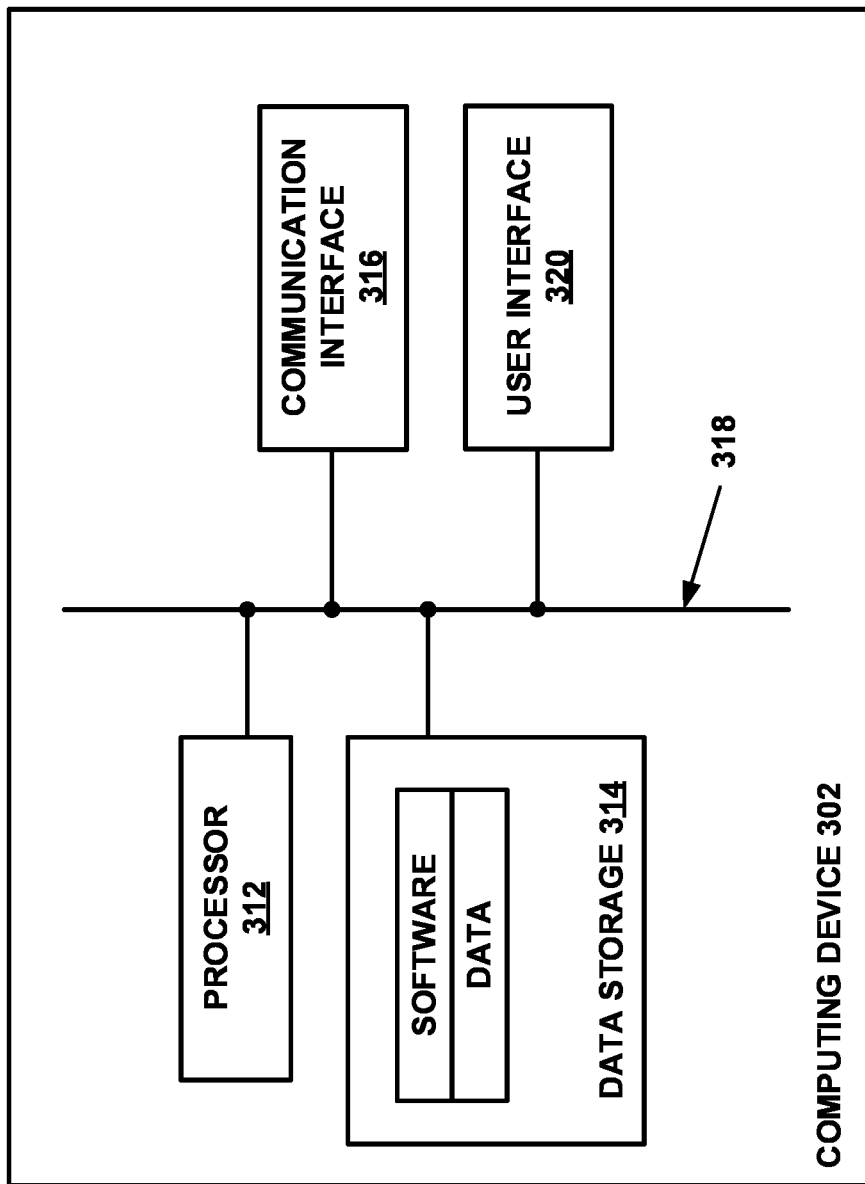
FIG. 3B depicts an example computing device that may be configured to carry out one or more of the functions of the present disclosure.

FIG. 3B is a simplified block diagram illustrating some structural components that may be included in an example computing device 302, which could serve as client station 214 of FIG. 2. Computing device 302 may generally comprise a processor 312, data storage 314, a communication interface 316, and user interface 320, all of which may be communicatively linked by a communication link 318 that may take the form of a system bus or some other connection mechanism. In this respect, in line with the discussion above, computing device 302 may take various forms, examples of which may include a desktop computer, a laptop, a netbook, a tablet, a smartphone, and/or a personal digital assistant (PDA), among other possibilities.

Processor 312 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed.

In turn, data storage 314 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 3B, data storage 314 may be provisioned with software components that enable computing device 302 to carry out functions disclosed herein. These software components may generally take the form of program instructions that are executable by processor 312 to carry out the disclosed functions, which may be arranged together into software applications, virtual machines, software development kits, toolsets, or the like. Further, data storage 314 may be arranged to store data in one or more databases, file systems, or the like. Data storage 314 may take other forms and/or store data in other manners as well.

Communication interface 316 may be configured to facilitate wireless and/or wired communication with another network-enabled system or device, such as back-end platform 202 or AR-enabled device 212. Communication interface 316 may take any suitable form, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 316 may also include multiple communication interfaces of different types. Other configurations are possible as well.

User interface 320 may be configured to facilitate user interaction with computing device 302 and may also be configured to facilitate causing computing device 302 to perform an operation in response to user interaction. Examples of user interface 320 include a touch-sensitive interface, mechanical interface (e.g., levers, buttons, wheels, dials, keyboards, etc.), and other input interfaces (e.g., microphones), among other examples. In some cases, user interface 320 may include or provide connectivity to output components, such as display screens, speakers, headphone jacks, and the like.

Although not shown, computing device 302 may additionally include one or more interfaces that provide connectivity with external user-interface equipment (sometimes referred to as "peripherals"), such as a keyboard, a mouse or trackpad, a display screen, a touch-sensitive interface, a stylus, speakers, etc., which may allow for direct user interaction with computing device 302.

It should be understood that computing device 302 is one example of a computing device that may be used with the embodiments described herein. Numerous other arrangements are possible and contemplated herein. For instance, other computing devices may include additional components not pictured and/or more or less of the pictured components.

IV. EXAMPLE AR-ENABLED DEVICE

Figure 3C:
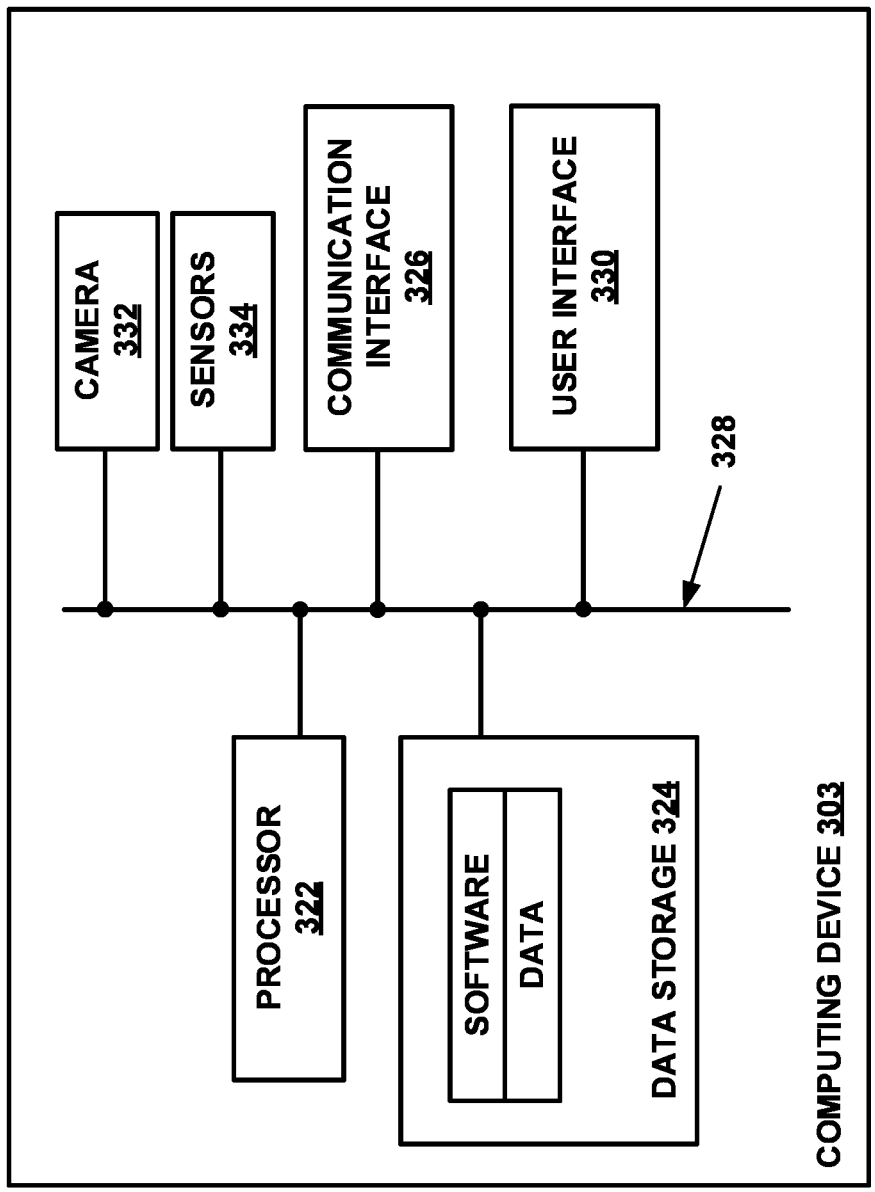
FIG. 3C depicts another example computing device that may be configured to carry out one or more of the functions of the present disclosure.

FIG. 3C is a simplified block diagram illustrating some structural components that may be included in an example AR-enabled computing device 303, which could serve as AR-enabled device 212 of FIG. 2.

AR-enabled computing device 303 may generally comprise a processor 322, data storage 324, communication interface 326, user interface 330, camera 332, and sensors 334, all of which may be communicatively linked by a communication link 328 that may take the form of a system bus or some other connection mechanism. In line with the discussion above, AR-enabled computing device 303 may take various forms, examples of which may include a wearable device, a laptop, a netbook, a tablet, and/or a smartphone, among other possibilities.

Processor 322 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed.

In turn, data storage 324 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 3C, data storage 324 may be provisioned with software components that enable AR-enabled computing device 303 to carry out functions disclosed herein. These software components may generally take the form of program instructions that are executable by processor 322 to carry out the disclosed functions, which may be arranged together into software applications, virtual machines, software development kits, toolsets, or the like. Further, data storage 324 may be arranged to store data in one or more databases, file systems, or the like. Data storage 324 may take other forms and/or store data in other manners as well.

Communication interface 326 may be configured to facilitate wireless and/or wired communication with another network-enabled system or device, such as back-end platform 202 or client station 214. Communication interface 326 may take any suitable form, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 326 may also include multiple communication interfaces of different types. Other configurations are possible as well.

User interface 330 may be configured to facilitate user interaction with AR-enabled computing device 303 and may also be configured to facilitate causing AR-enabled computing device 303 to perform an operation in response to user interaction. Examples of user interface 330 include a touch-sensitive interface, mechanical interface (e.g., levers, buttons, wheels, dials, keyboards, etc.), and other input interfaces (e.g., microphones), among other examples. In some cases, user interface 330 may include or provide connectivity to output components, such as display screens, speakers, headphone jacks, and the like.

Camera 332 may be configured to capture a real-world environment in the form of image data and may take various forms. As one example, camera 332 may be forward-facing to capture at least a portion of the real-world environment perceived by a user. One of ordinary skill in the art will appreciate that camera 332 may take various other forms as well.

Sensors 334 may be generally configured to capture data that may be used to determine the position and/or orientation of AR-enabled computing device 303. For instance, processor 322 may use sensor data from sensors 334 to determine the position and/or orientation of AR-enabled computing device 303. Alternatively, in line with the discussion above, AR-enabled computing device 303 may transmit sensor data from sensors 334 to another network-enabled system or device that is configured to determine the position and/or orientation of AR-enabled computing device 303, such as back-end platform 202 and/or client station 214. Examples of sensors 334 may include an accelerometer, gyroscope, and/or GPS, among other examples.

Although not shown, AR-enabled computing device 303 may additionally include one or more interfaces that provide connectivity with external user-interface equipment (sometimes referred to as "peripherals"), such as a keyboard, a mouse or trackpad, a display screen, a touch-sensitive interface, a stylus, speakers, etc., which may allow for direct user interaction with AR-enabled computing device 303.

It should be understood that AR-enabled computing device 303 is one example of a computing device that may be used with the embodiments described herein. Numerous other arrangements are possible and contemplated herein. For instance, other computing devices may include additional components not pictured and/or more or less of the pictured components.

V. EXAMPLE OPERATIONS

As described above, the present disclosure is generally directed to an improved AR technology for aligning virtual content with a real-world environment. The disclosed AR technology makes use of QR tape comprising a series of QR patterns to properly align virtual content on a real-world environment.

In one aspect, in line with the discussion above, to properly align virtual content on a real-world environment, the disclosed technology may involve installing QR tape on one or more objects in a given real-world environment such as a building. QR tape may be installed on various objects in a given real-world environment and may be installed in various manners.

For instance, QR tape may be installed on one or more walls in a construction building. In one particular example, QR tape can be installed on a specific wall of the building from one edge to another, vertically or horizontally. In another particular example, QR tape can be installed on a floor of the building or ceiling of the building from one edge to another, vertically or horizontally. QR tape may be installed on various other objects (e.g., doors, windows, etc.) and placed in various other manners as well.

In another aspect, as noted above, the disclosed AR technology may be embodied in the form of an AR software application that makes use of the installed QR tape to properly align virtual content on a real-world environment and then cause a computing device (e.g., AR-enabled device) to present a view of the real-world environment that has the aligned virtual content superimposed onto the real-world environment. At a high level, the disclosed AR software application may comprise (1) a first software component that functions to receive installation information and cause the installation information to be stored, (2) a second software component that functions to determine a position and orientation of a computing device (e.g., an AR-enabled device) and align virtual content on a real-world environment based on the determined position and orientation of the computing device (e.g., AR-enabled device), and (3) a third software component that functions to present a view of the real-world environment that has the aligned virtual content superimposed onto the real-world environment.

Figure 4:
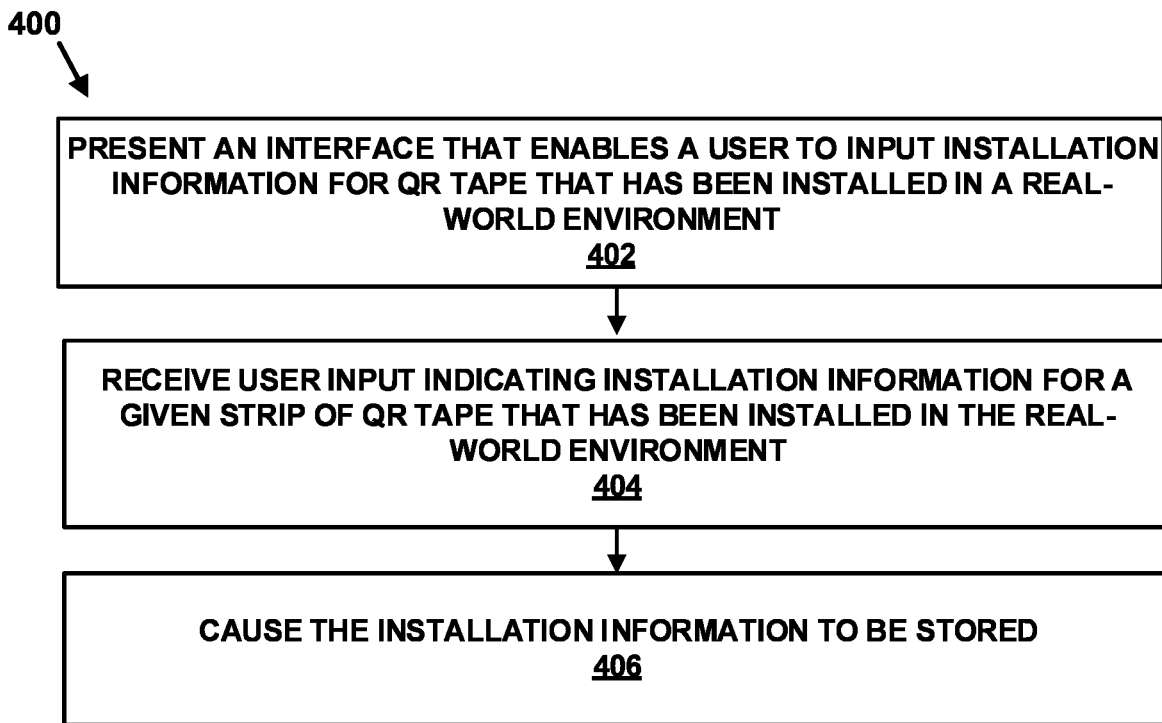
FIG. 4 depicts an example flow chart for receiving installation information and causing the installation information to be stored.

One possible example of the disclosed process for receiving installation information and causing the installation information to be stored will now be described with reference to FIG. 4. It should be understood that the flow diagram in FIG. 4 is merely described in such manner for the sake of clarity and explanation and that some functions may be carried out in various other manners as well, including the possibility that example functions may be added, removed, rearranged into different orders, grouped together, and/or not grouped together at all.

At block 402, a computing device running the first software component of the disclosed software application (e.g., back-end platform 202, AR-enabled device 212, or client station 214) may present an interface that enables the user to input installation information for QR tape that has been installed in a real-world environment. The computing device may present such an interface in response to a user request to access the interface or in response to receiving an indication that QR tape has been installed in a real-world environment. The computing device may present the interface at various other times as well.

At block 404, while presenting the interface that enables the user to input installation information for QR tape that has been installed in a real-world environment, the computing device running the first software component of the disclosed software application (e.g., back-end platform 202, AR-enabled device 212, or client station 214) may receive user input indicating installation information for a given strip of QR tape that has been installed in the real-world environment. The installation information may take various forms.

As one example, the installation information may comprise predefined information about the real-world environment. For instance, with respect to a construction building, the installation information may comprise predefined information about the objects in the construction building (e.g., walls, floors, ceilings, rooms, etc.), which may include information about the dimensions of a given object, distance between a given object and another object, and/or a layout of a given floor of the construction building, among other information. In this respect, the predefined information may take the form of a 3D model of a construction building. Depending on the real-world environment, the predefined information may take various other forms as well.

As another example, the installation information may comprise predefined information about the virtual content that is to be superimposed on a real-world environment. For instance, with respect to a construction building, the installation information may comprise predefined information about the virtual content (e.g., text, image, video, etc.) that is to be overlaid on objects in the construction building (e.g., walls, floors, ceilings, rooms, etc.). In this respective, such predefined information may take the form of a virtual 3D model of a construction building. Depending on the real-world environment, such predefined information may take various other forms as well.

As still another example, the installation information may comprise predefined information about QR patterns on a given strip of QR tape. For instance, the installation information may comprise predefined information about the mapping between respective identifiers and QR patterns on the given strip of QR tape, and/or the spacing between each QR pattern on the given strip of QR tape.

As yet another example, the installation information may comprise information about a given strip of QR tape that has been installed on a particular object in a given real-world environment. For instance, in some implementations, the installation information may comprise information regarding a layout of a given strip of QR tape, such as (1) a respective identifier of a QR pattern at the leading edge of a given strip of QR tape (e.g., the respective identifier labeled "3001" in FIG. 1), (2) an indication of where the leading edge of the given strip of QR tape has been installed (e.g., left edge of a particular wall in a building), and perhaps also (3) the direction that the given strip of QR tape has been installed (e.g., horizontal or vertical). In other implementations, the installation information may comprise "default" information, such as a "default" position on a wall where the leading edge of a given strip of QR tape is installed (e.g., the left edge of a given wall in a building) or a "default" direction that the given strip of QR tape is installed (e.g., horizontal), which may reduce the amount of information that needs to be input for the given strip of QR tape that has been installed and thereby simplify the input process. The installation information may take various other forms as well.

At step 406, the computing device running the first component of the disclosed software application (e.g., back-end platform 202, AR-enabled device 212, or client station 214) may cause the installation information to be stored in one or more datastores communicatively coupled to the computing device. In turn, the stored installation information may be later accessed by a computing device running the second component of the disclosed software application to determine a position and orientation or an AR-enabled device and align virtual content on a real-world environment. In this respect, such installation information could be encoded into the disclosed software application, accessed from a datastore that is accessible by a computing device running the disclosed software application, and/or input into the software application during this process (e.g., by uploading a BIM file).

After QR tape has been installed on objects in a given real-world environment and installation information for each strip of QR tape have been stored in one or more datastores, a user may begin using a computing device (e.g., an AR-enabled device) to view the given real-world environment, which may result in the computing device (e.g., AR-enabled device) detecting a given QR pattern on a given strip of QR tape that has been installed. For instance, a user may direct a computing device that may or may not have AR capabilities at a given QR pattern on a given strip of QR tape installed on a specific wall of a building and detect the given QR pattern (e.g., by capturing an image that comprises the given QR pattern). In one particular example involving AR-enabled device 212, a user may direct AR-enabled device 212 at a given QR pattern on a given strip of QR tape installed on a specific wall of a building, which may cause AR-enabled device 212 to detect the given QR pattern. AR-enabled device 212 may detect the given QR pattern in various manners.

In one implementation, AR-enabled device 212 running the disclosed software application may be configured to present an interface to align a given QR pattern in a given area of the AR-enabled device's field of view, and when a given QR pattern is within the given area, AR-enabled device 212 may detect the given QR pattern and provide an indication that the given QR pattern has been detected. One of ordinary skill in the art will appreciate that AR-enabled device 212 may detect a given QR pattern in various other manners as well.

Figure 5:
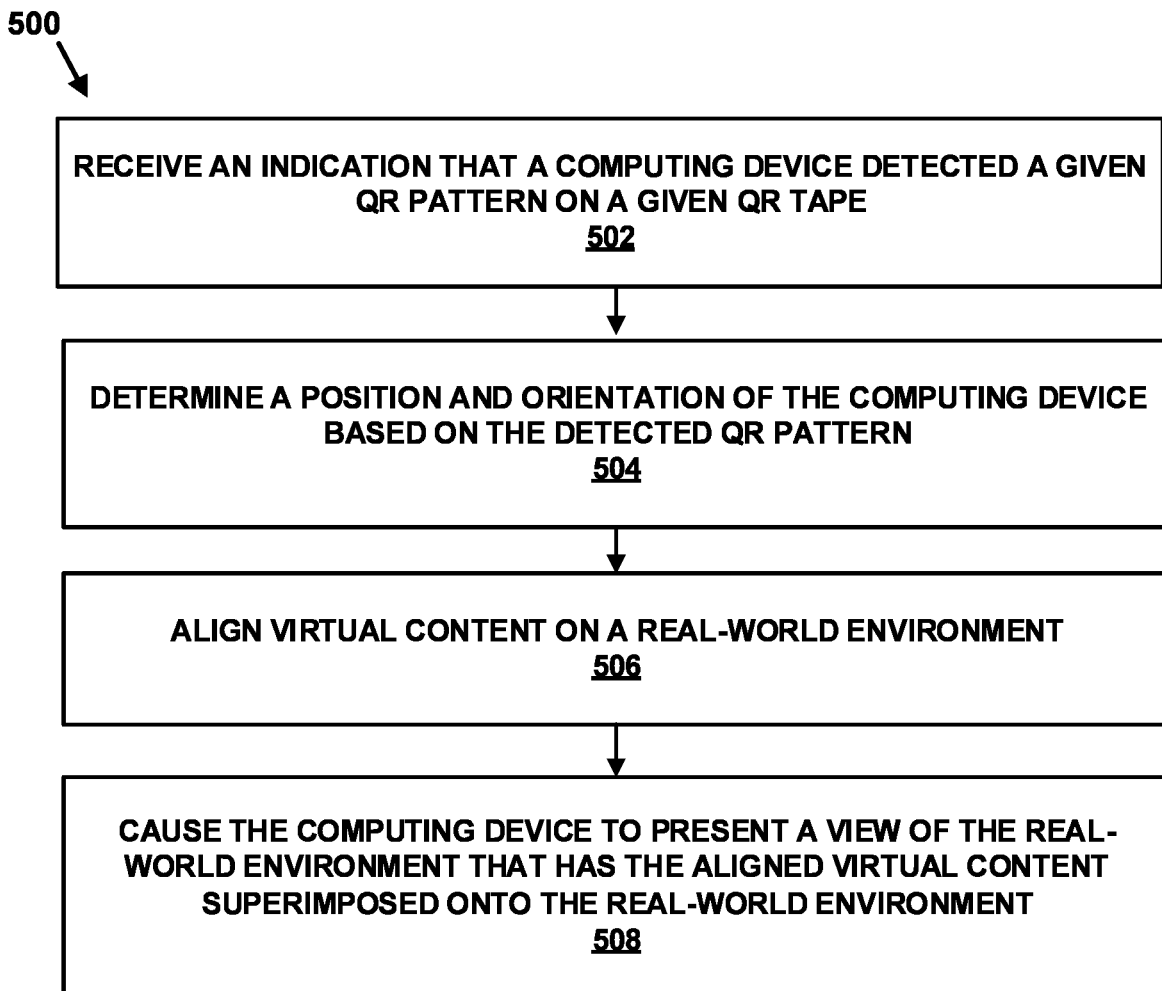
FIG. 5 depicts an example flow chart for determining a position and orientation of an AR-enabled device to present a superimposed view of the real-world environment overlaid with virtual content.

After a given QR pattern has been detected, the position and orientation of the computing device (e.g., AR-enabled device 212) may be determined to align virtual content on a real-world environment, and the computing device (e.g., AR-enabled device 212) may present a view of the real-world environment that has the aligned virtual content superimposed onto the real-world environment. One possible example of such process will now be described with reference to FIG. 5. It should be understood that the flow diagram in FIG. 5 is merely described in such manner for the sake of clarity and explanation and that some functions may be carried out in various other manners as well, including the possibility that example functions may be added, removed, rearranged into different orders, grouped together, and/or not grouped together at all.

At block 502, after a given QR pattern has been detected by the computing device (e.g., AR-enabled device 212), a computing device running the second component of the disclosed software application (e.g., back-end platform 202 or client station 214) may receive an indication that the computing device (e.g., AR-enabled device 212) detected the given QR pattern. For instance, in on example implementation, AR-enabled device 212 may be configured to facilitate wireless and/or wired communication with another network-enabled system or device, such as back-end platform 202 or client station 214, to send an indication that a given QR pattern has been detected. In another example implementation, AR-enabled device 212 may be configured to receive, via communication link 328, an indication that the AR-enabled device's camera (e.g., camera 332) has detected a given QR pattern. A computing device running the second component of the disclosed software application may receive such an indication in various other manners as well.

In accordance with the present disclosure, the indication that is received by the computing device running the second component of the disclosed software application may take various forms. For instance, the indication may comprise a respective identifier of the detected QR pattern or a sequence number that may be used to identify a respective identifier of the detected QR pattern. The received indication may take various other forms as well.

At block 504, in response to receiving an indication that the computing device (e.g., AR-enabled device 212) detected the given QR pattern, the computing device running the second component of the disclosed software application (e.g., back-end platform 202, AR-enabled device 212, or client station 214) may determine the position and orientation of the AR-enabled device based on the detected QR pattern. In accordance with the present disclosure, the position and orientation of a computing device (e.g., AR-enabled device 212) may be determined in various manners.

In one example implementation, determining the position and orientation of AR-enabled device 212 may involve determining the given strip of QR tape from which the given QR pattern originates and where the given QR pattern falls within the series of QR patterns on that given strip of QR tape. For instance, with respect to FIG. 1, in response to receiving an indication that AR-enabled device 212 detected QR pattern 111 on strip of QR tape 100 that may have been installed on a particular wall of a building, the computing device running the second component of the disclosed software application may access the stored installation information which may comprise predefined information about the mapping between respective identifiers and QR patterns on a given strip of QR tape. The computing device may then use the predefined information to determine that the QR pattern 111 having a respective identifier of "3001" is the second QR pattern on strip of QR tape 100. The computing device running the second component of the disclosed software application may determine the given strip of QR tape from which the given QR pattern originates and where the given QR pattern falls within the series of QR patterns on that given strip of QR tape in various other manners as well.

Based on determining the given strip of QR tape from which the given QR pattern originates and where the given QR pattern falls within the series of QR patterns on that given strip of QR tape, the computing device running the second component of the disclosed software application may then determine that the given QR pattern is on a given strip of QR tape that has been associated with a particular object in a real-world environment. For instance, referring back to FIG. 1, based on determining that QR pattern 111 is the second QR pattern on the strip of QR tape 100, the computing device running the second component of the disclosed software application may access the stored installation information that comprises predefined information about the real-world environment (e.g., a construction building) and information about QR tape 100 that has been installed on a particular object in the real-world environment (e.g., a specific wall of a construction building). The computing device may then use the installation information to determine that QR pattern 111 is on QR tape 100 that has been associated with a specific wall of a construction building. The computing device running the second component of the disclosed software application may determine a particular object in a real-world environment associated with a given QR pattern in various other manners as well.

In turn, the computing device running the second component of the disclosed software application may determine a relative location of the given QR pattern that has been detected, which may then be used to establish the position and orientation of AR-enabled device 212. The computing device may determine a relative location of the given QR pattern in various manners.

As one possibility, referring back to FIG. 1, the computing device running the second component of the disclosed software application may determine a relative location of QR pattern 111 by determining the location of QR pattern 110, which is at the leading edge of QR tape 100, and determining the distance between QR pattern 110 and QR pattern 111 (i.e., the second QR pattern on QR tape 100). For instance, the computing device running the second component of the disclosed software application may access the stored installation information that comprises information about QR tape 100 and predefined information about the spacing between each QR pattern on QR tape 100. The computing device running the second component may then determine the relative location of QR pattern 111 that was installed on a particular wall of a building based on the location of QR pattern 110 (which is at the leading edge of QR tape 100) and the known distance between QR pattern 110 and QR pattern 111—which is then used to establish the position and orientation of AR-enabled device 212.

The position and orientation of a computing device (e.g., an AR device) may be determined in various other manners as well. For instance, in another example implementation, the position and orientation of a computing device (e.g., an AR device) may be determined using a combination of one or more marker-based AR techniques known in the art.

Further, in yet another example implementation, as a user experiencing AR moves AR-enabled device 212 away from a given QR pattern such that AR-enabled device 212 can no longer detect the given QR pattern, the position and orientation of AR-enabled device 212 may be determined based on data from the AR device's sensors (e.g., sensors 334) until AR-enabled device 212 can detect another QR pattern on a given strip of QR tape that has been installed in the real-world environment, which may be the same strip of QR tape that comprises the given QR pattern or a different strip of QR tape that comprises a series of other QR patterns. For instance, referring back to FIG. 1, as a user experiencing AR moves from one area of a building to another such that AR-enabled device 212 can no longer detect QR pattern 111 associated with a particular wall of the building, the position and orientation of AR-enabled device 212 may be determined using various markerless AR techniques.

In one particular example, the computing device running the second component of the disclosed software application may receive sensor data from AR-enabled device 212 and then determine the position and orientation of AR-enabled device 212 relative to a given plane, where the position relative to the given plane is represented in terms of a "translation vector" and the orientation relative to the given plane is represented in terms of a "rotation matrix." The rotation matrix may comprise a 3-by-3 matrix and may be determined using samples from the AR-enabled device's sensors (e.g., accelerometer), and the translation vector may be determined using two-dimensional tracking of the relative movement of points between consecutive frames as the user with AR-enabled device 212 moves away from one area of a building to another. The computing device running the second component of the disclosed software application may then use the rotation matrix and translation vector to determine the position and orientation of AR-enabled device 212 until AR-enabled device 212 can detect another QR pattern on a given strip of QR tape that has been installed in the building.

In practice, to transition from determining the position and orientation of AR-enabled device 212 based on a relative location of a QR pattern that was detected to determining the position and orientation of AR-enabled device 212 based on sensor data, the computing device running the second component of the disclosed software application may apply a "smoothing" effect to account for differences between the two determinations, which may be related to sudden movements of AR-enabled device 212 in the real-world environment. For instance, to transition from determining the position and orientation of AR-enabled device 212 based on a relative location of a QR pattern that was detected to determining the position and orientation of AR-enabled device 212 based on sensor data, the translation vector may be determined by calculating the total translation in each coordinate of AR-enabled device 212 between a first frame and a second frame and determining an overall translation that accounts for sudden movements of AR-enabled device 212 as a user moves away from a given QR pattern that was detected in the real-world environment. For example, if the AR-enabled device's position changes from a first point having coordinates, x=4, y=5, z=6, to a second point having coordinates, x=7, y=5, z=6, the total translation in each respective coordinate of AR-enabled device 212 may be determined such that the position of AR-enabled device 212 is perceived to gradually change from the first point to the second point.

The position and orientation of AR-enabled device 212 may be determined using various other markerless AR techniques (or a combination of such techniques) as well, such as Simultaneous Localisation and Mapping ("SLAM"), Parallel Tracking and Mapping (PTAM), and/or GPS-based tracking, among other techniques.

Further, in another example implementation, as a user experiencing AR moves AR-enabled device 212 moves away from a given QR pattern, such that AR-enabled device 212 can no longer detect the given QR pattern, the position and orientation of AR-enabled device 212 may be determined based on a combination of data from the AR device's sensors (e.g., sensors 334) and information that pertains to the AR-enabled device's sensors until AR-enabled device 212 detects another QR pattern. For instance, the computing device running the second component of the disclosed software application may determine the difference between the position and orientation of AR-enabled device 212 determined based on sensor data and the position and orientation of AR-enabled device 212 determined based on a relative location of a QR pattern that was detected—which may indicate that the position and orientation of AR-enabled device 212 determined based on sensor data is off by a given value in a respective coordinate. The computing device running the second component of the disclosed software application may then cause such information to be stored in a datastore, such that the computing device may later access the stored information to determine the position and orientation of AR-enabled device 212 (e.g., by determining the position and orientation of AR-enabled device 212 using sensor data and then applying the determined difference in value(s) to the sensor data).

As noted above, once the AR-enabled device 212 detects another QR pattern, the computing device running the second component of the disclosed software application may determine the position and orientation of AR-enabled device 212 based on a relative location of the QR pattern that has been detected. In this respect, the computing device running the second component of the disclosed software application may apply a similar "smoothing" effect as described above to transition from determining the position and orientation of AR-enabled device 212 based on sensor data (and/or information that pertains to the AR-enabled device's sensors) back to determining the position and orientation of AR-enabled device 212 based on a relative location of a QR pattern that has been detected.

One of ordinary skill in the art will appreciate that the position and orientation of a computing device (e.g., an AR device) may be determined in various other manners as well.

At block 506, after determining position and orientation of the computing device (e.g., AR-enabled device 212), the computing device running the second component of the disclosed software application (e.g., back-end platform 202, AR-enabled device 212, or client station 214) may be configured to align virtual content on a real-world environment, which may involve identifying the virtual content that is to be overlaid on the real-world environment. The computing device running the second component of the disclosed software application may align virtual content on a real-world environment in various manners.

As one example, referring back to FIG. 1, after determining the relative location of QR pattern 111 that was installed on a particular wall of a building, which is then used to establish the position and orientation of AR-enabled device 212, the computing device running the second component of the disclosed software application may access the installation information that was stored in a datastore that comprises predefined information about the virtual content that is to be superimposed onto a real-world environment. In particular, the computing device running the second component of the disclosed software application may access the predefined information about the virtual content that is to be superimposed on the particular wall of the building in which QR pattern 111 was installed, along with the surrounding areas of the particular wall. The computing device running the second component of the disclosed software application may then properly align the virtual content with the particular wall of the building in which QR pattern 111 was installed based on the determined position and orientation of AR-enabled device 212.

Further, as a user experiencing AR moves AR-enabled device 212 moves away from a QR pattern 111, such that AR-enabled device 212 can no longer detect QR pattern 111, the computing device running the second component of the disclosed software application may update the alignment of virtual content on the real-world environment (e.g., building) based on determining the updated position and orientation of AR-enabled device 212. In this respect, the computing device running the second component of the disclosed software application may update the alignment of virtual content on the real-world environment at various times as the position and orientation of AR-enabled device 212 is updated.

The computing device running the second component of the disclosed software application may align virtual content on a real-world environment in various other manners as well.

At block 508, after virtual content is aligned on a real-world environment, the computing device running the third component of the disclosed software application may cause a computing device (e.g., AR-enabled device 212) to present a view of the real-world environment that has the aligned virtual content superimposed onto the real-world environment. For instance, in on example implementation, a network-enabled system or device, such as back-end platform 202 or client station 214, may be configured to facilitate wireless and/or wired communication with AR-enabled device 212 to cause AR-enabled device 212 to present a view of the real-world environment that has the aligned virtual content superimposed onto the real-world environment. In another example implementation, AR-enabled device 212 may be configured to cause the AR-enabled device's user interface (e.g., user interface 330) to present a view of the real-world environment that has the aligned virtual content superimposed onto the real-world environment.

One of ordinary skill in the art will appreciate that the virtual content that is superimposed onto the real-world environment may be presented in various manners and may be updated at various times as a user experiencing AR moves from one area of a real-world environment to another. Further, one of ordinary skill in the art will appreciate that the disclosed process may be carried out in various other manners as well.

VI. CONCLUSION

Example embodiments of the disclosed innovations have been described above. Those skilled in the art will understand, however, that changes and modifications may be made to the embodiments described without departing from the true scope and spirit of the present invention, which will be defined by claims.

Further, to the extent that examples described herein involve operations performed or initiated by actors, such as "humans," "operators," "users" or other entities, this is for purposes of example and explanation only. Claims should not be construed as requiring action by such actors unless explicitly recited in claim language.

The invention claimed is:

1. A computing system comprising:
   at least one processor;
   at least one non-transitory computer-readable medium;
   program instructions stored on the at least one non-transitory computer-readable medium that are executable by the at least one processor such that the computing system is configured to:
      cause a first computing device to present a first user interface for providing installation information for a strip of Quick Response ("QR") tape that has been installed in a real-world environment;
      receive, from the first computing device, data defining given installation information for a given strip of QR tape that was provided via the first user interface;
      cause a second computing device to present a second user interface for aligning a QR pattern within a given area of the second computing device's field of view;
      determine that the second computing device has detected a given QR pattern on the given strip of QR tape;
      after determining that the second computing device has detected the given QR pattern on the given strip of QR tape, determine a position and orientation of the second computing device based at least on (i) an identifier of the given QR pattern on the given strip of QR tape and (ii) the given installation information for the given strip of QR tape;
      align virtual content on a given portion of the real-world environment within the second computing device's field of view based on the determined position and orientation of the second computing device; and
      cause the second computing device to present a view of the aligned virtual content superimposed onto the given portion of the real-world environment.

2. The computing system of claim 1, wherein the given installation information for the given strip of QR tape includes one or more of: (i) a respective identifier for each QR pattern on the given strip of QR tape, (ii) a predefined location of a reference QR pattern on the given strip of QR tape relative to a reference point in the real-world environment; (iii) predefined information about spacing between the QR patterns on the given strip of QR tape; or (iv) a predefined direction in which the given strip of QR tape has been installed.

3. The computing system of claim 2, wherein the reference QR pattern on the given strip of QR tape comprises a QR pattern at a leading edge of the given strip of QR tape.

4. The computing system of claim 2, wherein the given QR pattern comprises the reference QR pattern.

5. The computing system of claim 1, wherein the given installation information for the given strip of QR tape comprises at least (i) a predefined location of a reference QR pattern on the given strip of QR tape relative to a reference point in the real-world environment and (ii) predefined information about spacing between the QR patterns on the given strip of QR tape, and wherein the program instructions that are executable by the at least one processor such that the computing system is configured to determine the position and orientation of the second computing device comprise program instructions that are executable by the at least one processor such that the computing system is configured to:
    determine a location of the given QR pattern relative to the reference point in the real-world environment based on (i) the identifier of the given QR pattern (ii) the predefined location of the reference QR pattern, and (iii) the predefined information about the spacing between the QR patterns on the given strip of QR tape; and
    determine the position and orientation of the second computing device relative to the reference point in the real-world environment based on the determined location of the given QR pattern.

6. The computing system of claim 1, wherein the first computing device and the second computing device comprise a same computing device.

7. The computing system of claim 1, further comprising program instructions stored on the at least one non-transitory computer-readable medium that are executable by the at least one processor such that the computing system is configured to:
    after receiving the data defining the given installation information for the given strip of QR tape, store the data defining the given installation information for the given strip of QR tape.

8. The computing system of claim 1, further comprising program instructions stored on the at least one non-transitory computer-readable medium that are executable by the at least one processor such that the computing system is configured to:
    after determining that the second computing device has detected the given QR pattern on the given strip of QR tape, obtain one or more of (i) information about the given QR pattern on the given strip of QR tape, (ii) information about the real-world environment, or (iii) information about the virtual content that is to be superimposed onto the real-world environment.

9. The computing system of claim 1, wherein the determined position and orientation of the second computing device comprises a first position and orientation, and wherein the computing system further comprises program instructions stored on the at least one non-transitory computer-readable medium that are executable by the at least one processor such that the computing system is configured to:
    determine that the first position and orientation of the second computing device has changed and that a new QR pattern was not detected in association with the change;
    determine a second position and orientation of the second computing device based on sensor data for the second computing device; and
    update the alignment of the virtual content on the given portion of the real-world environment within the second computing device's field of view based on the second position and orientation of the second computing device.

10. The computing system of claim 9, wherein the program instructions that are executable by the at least one processor such that the computing system is configured to update the alignment of the virtual content on the given portion of the real-world environment within the second computing device's field of view based on the second position and orientation of the second computing device comprise program instructions that are executable by the at least one processor such that the computing system is configured to:
    smooth to transition from the first position and orientation to the second position and orientation of the second computing device.

11. The computing system of claim 9, wherein the given strip of QR tape comprises a first strip of QR tape, wherein the given QR pattern comprises a first QR pattern, and wherein the computing system further comprises program instructions stored on the at least one non-transitory computer-readable medium that are executable by the at least one processor such that the computing system is configured to:
    after updating the alignment of the virtual content on the given portion of the real-world environment within the second computing device's field of view based on the second position and orientation of the second computing device:
        determine that the second computing device has detected a second QR pattern on a second strip of QR tape that has been installed in the real-world environment;
        determine a third position and orientation of the second computing device based at least on (i) a respective identifier of the second QR pattern and (ii) respective installation information for the second strip of QR tape; and
        align new virtual content on the given portion of the real-world environment within the second computing device's field of view based on the determined third position and orientation of the second computing device.

12. The computing system of claim 1, wherein the program instructions that are executable by the at least one processor such that the computing system is configured to determine that the second computing device has detected the given QR pattern on the given strip of QR tape comprise program instructions that are executable by the at least one processor such that the computing system is configured to:
    determine that the second computing device has detected the given QR pattern on the given strip of QR tape based on receiving, from the second computing device, an indication that the given QR pattern has been detected within the second computing device's field of view.

13. At least one non-transitory computer-readable medium, wherein the at least one non-transitory computer-readable medium is provisioned with program instructions that, when executed by at least one processor, cause a computing system to:
    cause a first computing device to present a first user interface for providing installation information for a strip of Quick Response ("QR") tape that has been installed in a real-world environment;
    receive, from the first computing device, data defining given installation information for a given strip of QR tape that was provided via the first user interface;

cause a second computing device to present a second user interface for aligning a QR pattern within a given area of the second computing device's field of view;

determine that the second computing device has detected a given QR pattern on the given strip of QR tape;

after determining that the second computing device has detected the given QR pattern on the given strip of QR tape, determine a position and orientation of the second computing device based at least on (i) an identifier of the given QR pattern on the given strip of QR tape and (ii) the given installation information for the given strip of QR tape;

align virtual content on a given portion of the real-world environment within the second computing device's field of view based on the determined position and orientation of the second computing device; and cause the second computing device to present a view of the aligned virtual content superimposed onto the given portion of the real-world environment.

14. The at least one non-transitory computer-readable medium of claim 13, wherein the given installation information for the given strip of QR tape includes one or more of: (i) a respective identifier for each QR pattern on the given strip of QR tape, (ii) a predefined location of a reference QR pattern on the given strip of QR tape relative to a reference point in the real-world environment; (iii) predefined information about spacing between the QR patterns on the given strip of QR tape; or (iv) a predefined direction in which the given strip of QR tape has been installed.

15. The at least one non-transitory computer-readable medium of claim 13, wherein the given installation information for the given strip of QR tape comprises at least (i) a predefined location of a reference QR pattern on the given strip of QR tape relative to a reference point in the real-world environment and (ii) predefined information about spacing between the QR patterns on the given strip of QR tape, and wherein the program instructions that, when executed by at least one processor, cause the computing system to determine the position and orientation of the second computing device comprise program instructions that, when executed by at least one processor, cause the computing system to:

determine a location of the given QR pattern relative to the reference point in the real-world environment based on (i) the identifier of the given QR pattern (ii) the predefined location of the reference QR pattern, and (iii) the predefined information about the spacing between the QR patterns on the given strip of QR tape; and determine the position and orientation of the second computing device relative to the reference point in the real-world environment based on the determined location of the given QR pattern.

16. The at least one non-transitory computer-readable medium of claim 13, wherein the at least one non-transitory computer-readable medium is also provisioned with program instructions that, when executed by at least one processor, cause the computing system to:

after receiving the data defining the given installation information for the given strip of QR tape, store the data defining the given installation information for the given strip of QR tape.

17. A method carried out by a computing system, the method comprising:

causing a first computing device to present a first user interface for providing installation information for a strip of Quick Response ("QR") tape that has been installed in a real-world environment;

receiving, from the first computing device, data defining given installation information for a given strip of QR tape that was provided via the first user interface;

causing a second computing device to present a second user interface for aligning a QR pattern within a given area of the second computing device's field of view;

determining that the second computing device has detected a given QR pattern on the given strip of QR tape;

after determining that the second computing device has detected the given QR pattern on the given strip of QR tape, determining a position and orientation of the second computing device based at least on (i) an identifier of the given QR pattern on the given strip of QR tape and (ii) the given installation information for the given strip of QR tape;

aligning virtual content on a given portion of the real-world environment within the second computing device's field of view based on the determined position and orientation of the second computing device; and causing the second computing device to present a view of the aligned virtual content superimposed onto the given portion of the real-world environment.

18. The method of claim 17, wherein the given installation information for the given strip of QR tape includes one or more of: (i) a respective identifier for each QR pattern on the given strip of QR tape, (ii) a predefined location of a reference QR pattern on the given strip of QR tape relative to a reference point in the real-world environment; (iii) predefined information about spacing between the QR patterns on the given strip of QR tape; or (iv) a predefined direction in which the given strip of QR tape has been installed.

19. The method of claim 17, wherein the given installation information for the given strip of QR tape comprises at least (i) a predefined location of a reference QR pattern on the given strip of QR tape relative to a reference point in the real-world environment and (ii) predefined information about spacing between the QR patterns on the given strip of QR tape, and wherein determining the position and orientation of the second computing device comprises:

determining a location of the given QR pattern relative to the reference point in the real-world environment based on (i) the identifier of the given QR pattern (ii) the predefined location of the reference QR pattern, and (iii) the predefined information about the spacing between the QR patterns on the given strip of QR tape; and determining the position and orientation of the second computing device relative to the reference point in the real-world environment based on the determined location of the given QR pattern.

* * * * *